United States Patent
Schmitz

[11] Patent Number: 5,833,309
[45] Date of Patent: *Nov. 10, 1998

[54] CHILD CAR SEAT TEMPERATURE CONTROL DEVICE AND METHOD

[76] Inventor: Jeffrey T. Schmitz, 1740 W. Stanford Ave., Gilbert, Ariz. 85233

[*] Notice: This patent issued on a continued prosecution application filed under 37 CFR 1.53(d), and is subject to the twenty year patent term provisions of 35 U.S.C. 154(a)(2).

[21] Appl. No.: 677,080

[22] Filed: Jul. 9, 1996

[51] Int. Cl.$^6$ .................................................. A47C 7/72
[52] U.S. Cl. ............................. 297/180.11; 297/188.04; 297/219.12; 297/228.11; 297/250.1; 5/420; 5/421; 5/485
[58] Field of Search ........................... 297/180.11, 180.1, 297/188.04, 219.12, 228.11, 256.15, 250.1, 183.5; 5/417, 420, 485, 490, 421

[56] References Cited

U.S. PATENT DOCUMENTS

| | | | |
|---|---|---|---|
| 794,145 | 7/1905 | Ellington et al. | 297/228.11 |
| 2,596,547 | 5/1952 | Guest | 5/485 X |
| 3,802,220 | 4/1974 | Pompo | 62/530 |
| 3,951,127 | 4/1976 | Watson et al. | 5/347 X |
| 4,304,824 | 12/1981 | Karpinski | 428/69 |
| 4,478,453 | 10/1984 | Schutz | 297/219.12 |
| 4,604,987 | 8/1986 | Kutner | 5/421 X |
| 4,790,042 | 12/1988 | Reich | 5/421 X |
| 4,883,701 | 11/1989 | Rankin et al. | 297/219.12 X |
| 4,885,200 | 12/1989 | Perdelwitz, Jr. et al. | 297/219.12 X |
| 4,892,769 | 1/1990 | Perdelwitz, Jr. et al. | 297/219.12 X |
| 4,995,126 | 2/1991 | Matsuda | 5/421 |
| 5,010,610 | 4/1991 | Ackley | 5/420 X |
| 5,150,945 | 9/1992 | Aupperlee et al. | 297/219.12 X |
| 5,168,590 | 12/1992 | O'sullivan | 5/485 X |
| 5,228,745 | 7/1993 | Hazel | 297/219.12 X |
| 5,366,271 | 11/1994 | Johnston et al. | 297/250.1 |
| 5,468,020 | 11/1995 | Seime | 297/219.12 X |
| 5,482,392 | 1/1996 | Leal et al. | 297/219.12 X |
| 5,624,156 | 4/1997 | Leal et al. | 297/219.12 X |
| 5,662,380 | 9/1997 | Tam et al. | 297/219.12 X |

*Primary Examiner*—Peter M. Cuomo
*Assistant Examiner*—Rodney B. White
*Attorney, Agent, or Firm*—Dilworth & Barrese

[57] ABSTRACT

A temperature control device for cooling a hot car seat surface is disclosed. The device comprises covering means for covering substantially all of the surface area of the car seat, a pocket or space for receiving a buckling apparatus, and cooling means for cooling both the car seat surface and buckling apparatus. The temperature control device may also be rolled up, readily stored, and reused. The temperature control device may also be used to warm a cold car seat surface and buckling apparatus, by substituting warming material for cooling material in the device.

16 Claims, 2 Drawing Sheets

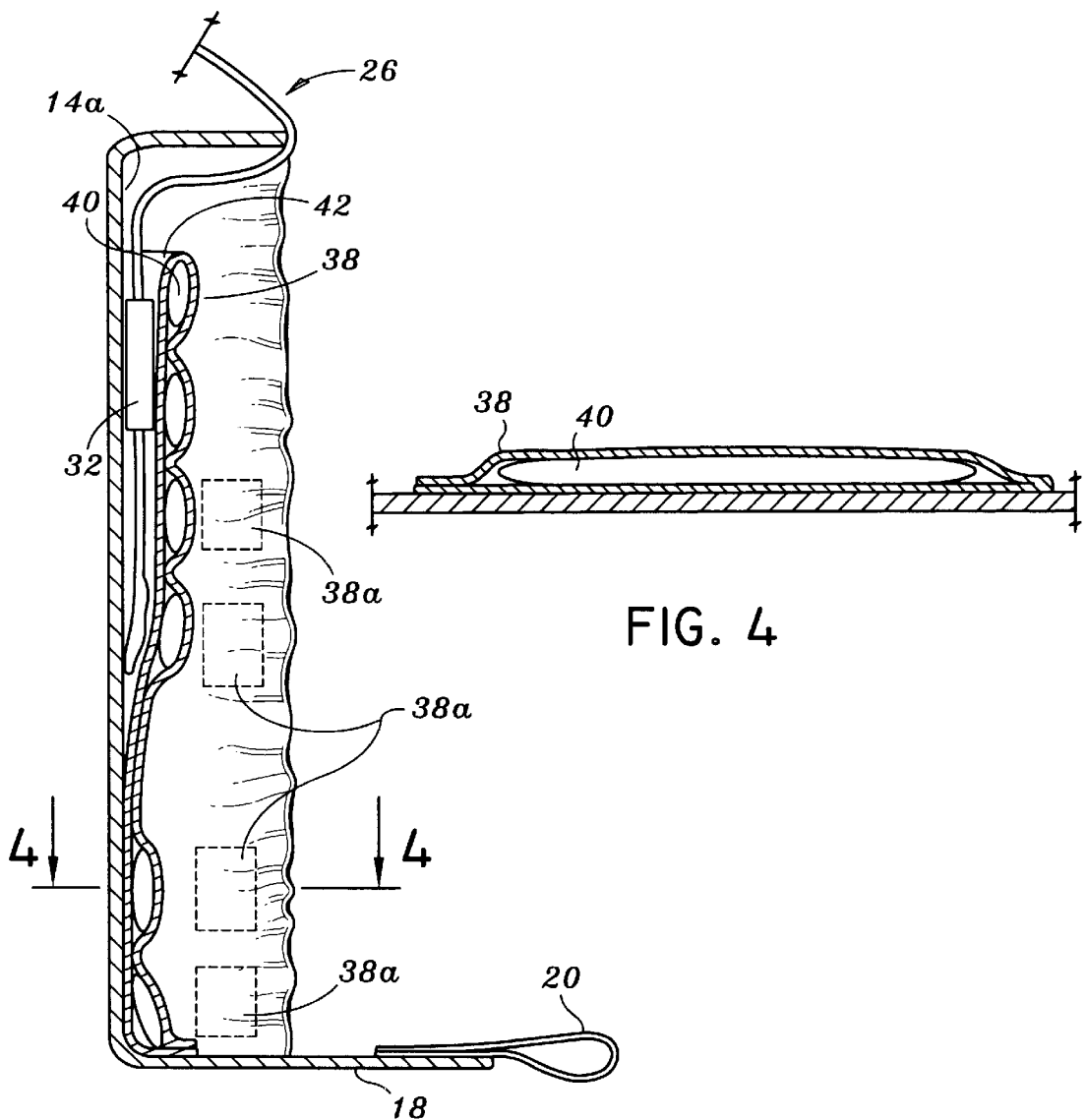
FIG. 4
FIG. 3
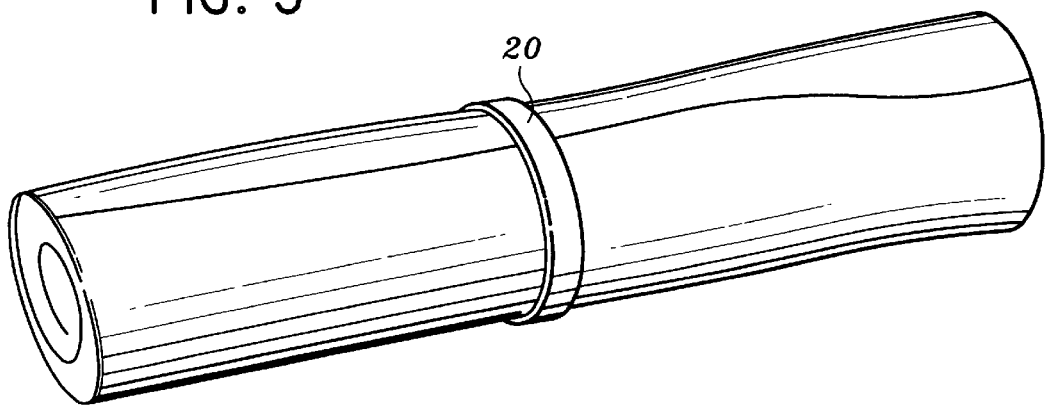
FIG. 5

CHILD CAR SEAT TEMPERATURE CONTROL DEVICE AND METHOD

BACKGROUND OF THE INVENTION

1. Field of the Invention

This invention relates generally to child car seat devices and methods therefor, and more specifically relates to devices for cooling the hot surface of a child car seat and buckling apparatus or warming the cold surface of a child car seat and buckling apparatus so as to make the child car seat comfortable and safe for a child and a method therefor.

2. Description of the Related Art

In hot temperatures, the surface area of a child car seat, including the buckling apparatus, can become very hot. Unless these areas are cooled before a child is placed in the car seat, the child will be uncomfortable and may possibly be burned by the hot surface of the car seat or the metal or plastic buckling apparatus.

In the past, a number of devices have been used to attempt to alleviate this problem. For example, U.S. Pat. No. 5,150, 945 issued to Aupperlee, et al. discloses a removable child seat cover, to be placed over a car seat when not in use and to be removed before placing the child into the car seat. The removable cover disclosed in Aupperlee, et. al. is placed over the child car seat when not in use, so as to protect the car seat surface from direct exposure to the sunlight. For example, a user going on a shopping trip with a small child would travel to the shopping center with the child restrained in the car seat, remove the child from the car seat upon arriving at the shopping center, place the cover on the car seat after removing the child, and then remove the cover after returning to the car before placing the child into the car seat for the drive away from the shopping center.

While removable covers of this type provide some short-term benefit in terms of limiting the amount by which the surface of the car seat will heat up when exposed to direct sunlight, even a covered car seat can become significantly hot where the temperature outside of the car is sufficiently high and the car windows have been closed. Indeed, after a period of time, the length of which depends on the temperature inside the car, removable covers of the type disclosed in Aupperlee cease to providing any meaningful cooling benefit. Moreover, a removable car seat of the type disclosed in Aupperlee, et al. cannot be used to rapidly cool a car seat that is already hot because the car seat has been left directly exposed to sunlight. Thus, if the user forgot to place the cover over the car seat before leaving the car—e.g., if the user forgot to place the cover over the car seat after taking the child from the car to go shopping—the cover would be of no use in cooling down the hot car seat upon the user's return to the car.

Accordingly, there existed a need to provide an improved car seat cooling device and method that would be able to cool down a hot car seat surface—as opposed to merely limiting the amount by which the car seat surface will heat up when exposed to direct sunlight. Moreover, the improved car seat cooling device and method must also be able to cool down the car seat's buckling apparatus, the metal parts of which can become extremely hot and dangerous under certain circumstances. Because the cooling device must be used by a person who often will be holding a child, and because the cooling device must be removed from the car seat before a child is placed therein, the improved cooling device must be capable of being removed by the user with only one hand. Additionally, because the cooling device will typically be transported inside of a car where space is at a premium, the cooling device must be able to be secured in a limited space—ideally in a rolled-up position.

Although perhaps less dangerous, a car seat surface that has become extremely cold because of exposure to cold weather can also be a source of discomfort to a child. Removable car seat covers of the type disclosed in Aupperlee, et al. are of no benefit in this kind of situation. Thus, a need existed for a device to warm the cold surface area of a car seat and buckling apparatus, so as to make that surface area more comfortable and inviting to a child. The car seat warming device, like the improved car seat cooling device, must be capable of being removed by the user with only one hand and must be able to be to be secured in a limited space.

SUMMARY OF THE INVENTION

In accordance with one embodiment of this invention, it is an object of this invention to provide an improved, removable, child car seat temperature control device and method.

It is another object of this invention to provide an improved, removable, child car seat temperature control device and method that is capable of cooling down a hot car seat surface, including a car seat buckling apparatus.

It is yet another object of this invention to provide an improved, removable, child car temperature control device and method that is capable of warming a cold car seat surface, including a car seat buckling apparatus.

It is a further object of this invention to provide an improved, removable, child car seat temperature control device and method that may be removed from a car seat with one hand.

It is a still further object of this invention to provide an improved, removable, child car seat temperature control device that may be rolled-up for storage when not in use.

It is still another object of this invention to provide an improved, removable, child car seat temperature control device and method whereby the device can be rapidly and securely attached to a child car seat and/or quickly detached therefrom.

BRIEF DESCRIPTION OF THE PREFERRED EMBODIMENTS

In accordance with one embodiment of this invention, a removable child car seat cooling device is disclosed. The removable child car seat cooling device comprises, in combination: covering means for covering substantially all of a top surface of a seat portion and all of a top surface of a head and backrest portion of a child car seat, the covering means having a top surface and a bottom surface wherein the bottom surface contacts the top surface of the seat portion and the top surface of the head and backrest portion of the child car seat; cooling means coupled to the bottom surface of the covering means for cooling the top surface of the seat portion and the top surface of the head and backrest portion of the child car seat; and means for removably securing the covering means to the car seat.

In accordance with another embodiment of this invention, a removable child car seat warming device is disclosed. The removable child car seat warming device comprises, in combination: covering means for covering substantially all of a top surface of a seat portion and all of a top surface of a head and backrest portion of a child car seat, the covering means having a top surface and a bottom surface wherein the bottom surface contacts the top surface of the seat portion and the top surface of the head and backrest portion of the child car seat; warming means coupled to the bottom surface of the covering means for warming the top surface of the seat portion and the top surface of the head and backrest portion of the child car seat; and means for removably securing the covering means to the car seat.

In accordance with a further embodiment of the present invention, a method for cooling a child car seat is disclosed. The method comprises the steps of: providing covering means for covering substantially all of a top surface of a seat portion and all of a top surface of a head and backrest portion of a child car seat, the covering means having a top surface and a bottom surface wherein the bottom surface contacts the top surface of the seat portion and the top surface of the head and backrest portion of the child car seat; providing cooling means coupled to the bottom surface of the covering means for cooling the top surface of the seat portion and the top surface of the head and backrest portion of the child car seat; and providing means for removably securing the covering means to the car seat.

In accordance with yet another embodiment of the present invention, a method for cooling a child car seat is disclosed. The method comprises the steps of: providing covering means for covering substantially all of a top surface of a seat portion and all of a top surface of a head and backrest portion of a child car seat, the covering means having a top surface and a bottom surface wherein the bottom surface contacts the top surface of the seat portion and the top surface of the head and backrest portion of the child car seat; providing cooling means coupled to the bottom surface of the covering means for cooling the top surface of the seat portion and the top surface of the head and backrest portion of the child car seat; providing means for removably securing the covering means to the car seat; freezing the cooling means; securing the covering means to the car seat; leaving the covering means secured to the car seat until the car seat has been sufficiently cooled; and removing the covering means from the car seat.

The foregoing and other objects, features, and advantages of the invention will be apparent from the following, more particular, description of the preferred embodiments of the invention, as illustrated in the accompanying drawings.

BRIEF DESCRIPTION OF THE DRAWINGS

FIG. 3 is a cross-sectional side view of the removable car seat temperature control device of FIG. 2 taken along line 3—3.

FIG. 4 is a cross-sectional view of one of the pockets containing cooling or warming material, taken along line 4—4 of FIG. 3.

FIG. 5 is a perspective view of the removable car seat temperature control device of the present invention in a rolled-up position for storage.

DESCRIPTION OF THE PREFERRED EMBODIMENTS

Figure 1:
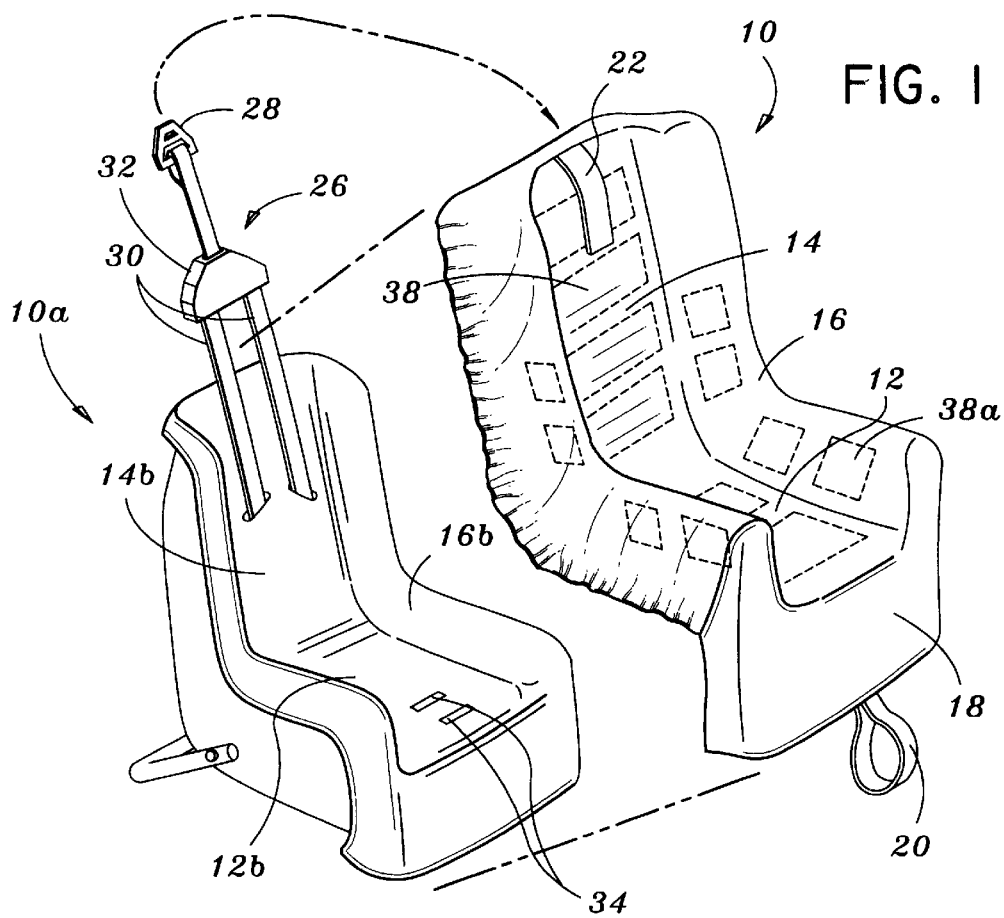
FIG. 1 is a break-away type of perspective view of the preferred embodiment of a removable car seat temperature control device, as shown prior to placement on a child car seat.
Figure 2:
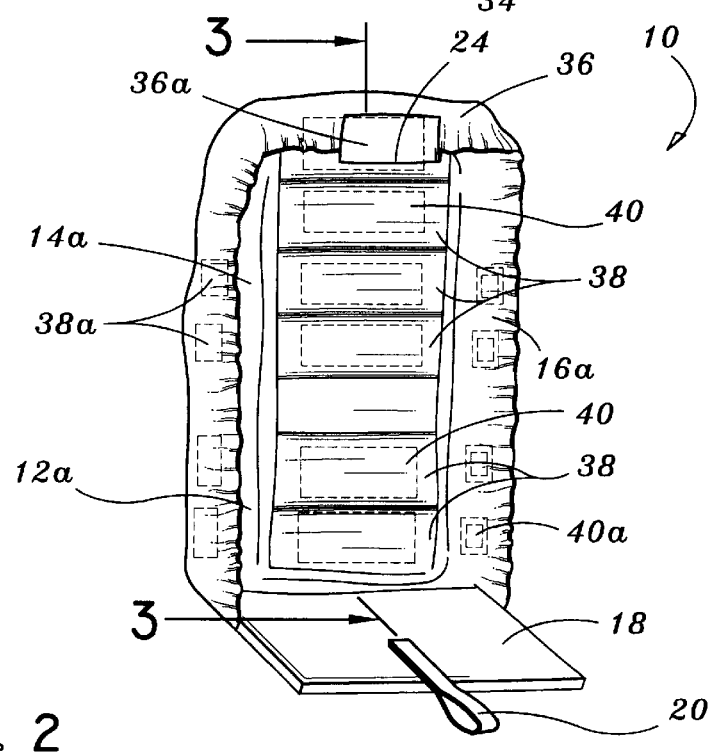
FIG. 2 is a rear view of the preferred embodiment of a removable car seat temperature control device.

Referring to FIGS. 1 and 2, a removable child car seat temperature control device 10 having a top surface and a bottom surface is provided. The top surface of the temperature control device 10 is comprised of a seat portion 12 and a head and backrest portion 14, while the bottom surface of the temperature control device 10 has a corresponding seat portion 12a and head and backrest portion 14a. The seat portion and head and backrest portion of the temperature control device 10 substantially correspond in size and dimension to the seat portion 12b and head and backrest portion 14b of a child car seat 10a, with the seat portion 12a of the device 10 being fitted to contact and cover the seat portion 12b of the car seat 10a and the head and backrest portion 14a of the device 10 being fitted to contact and cover the head and backrest portion 14b of the car seat 10a. Side portions 16 are preferably located on both sides of the seat portion 12 and the head and backrest portion 14 of the device 10, while the bottom surface of the temperature control device 10 has corresponding side portions 16a. The side portions 16 of the temperature control device 10 substantially correspond in size and dimension to the side portions 16b of the child car seat 10a. Flap 18 of the device 10 extends below seat portion 12 and side portions 16 and, from the end of flap 18, a storage or tie-up type strap 20 is attached thereto. Located at the upper end of the head and backrest portion 14 of the device 10 is a device removal or gripping handle 22. The device 10 is preferably comprised of a quilted fabric, which fabric has insulating air pockets which help maintain the cooling or warming effect of the device 10.

Car seat 10a features one type of a buckling apparatus 26. There are different styles and shapes of car seat buckling apparatuses. The buckling apparatus 26 shown in FIG. 1 is a typical variety, whereby a buckle insert 28 is secured to a car seat 10a with straps 30. Buckle insert 28 may be inserted into one of a plurality of buckle receiving apertures 34 located in the seat portion 12b of the car seat 10a. Often, the buckling apparatus 26 includes a relatively large padded member 32 as shown in FIG. 1. In another common variety of child car seat, the large padded member 32 is not featured or used. In child car seats of this design, a post (not shown) is located substantially where the buckle receiving apertures 34 of car seat 10a are located, and this post contains a buckle receiving aperture to receive the buckling apparatus' buckle insert.

As shown in FIG. 2, preferably a flap 36 extends outwardly from the head and backrest portion 14 of the device 10, which flap 36 extends around the curved outer side portions 16a of the child car seat 10a for rapid attachment of the temperature control device 10. Located at the edge portions of the flap 36 for attachment around the edge portion of the side portions 16 is an elastic band 24, for removably securing the temperature control device 10 to a child car seat 10a. A substantially rectangular area 36a is cut out of the top portion of the flap 36, which area 36a must be sufficiently large to allow the large padded member 32 (or equivalent structure) to pass therethrough and be inserted into the temperature control device 10 (see FIG. 3). The elastic band 24 extends continuously around the edges of the side portions 16 because of attachment to the flap 36, including across the bottom of the open rectangular area 36a, so as to maintain the temperature control device 10 securely in position over the car seat 10a.

As shown in FIGS. 2 and 3 and in phantom in FIGS. 1 and 2, a plurality of substantially rectangular pockets 38 are sewn into or otherwise attached or coupled to the bottom surface of the temperature control device 10; i.e., to seat portion 12a and to head and backrest portion 14a. Preferably, four pockets 38 are coupled to the head and backrest portion 14a, while two pockets 38 are coupled to the seat portion 12a. A plurality of substantially square pockets 38a are preferably also sewn into or otherwise attached or coupled to side portions 16a; however, the device 10 will retain a substantial portion of its effectiveness without pockets 38a. Preferably, four pockets 38a are located on side portions 16a adjacent the smaller ends of the pockets 38 that are coupled to the seat portion 12a, and four pockets 38a are located on side portions 16a adjacent the smaller ends of the two pockets 38 that are coupled to the head and backrest portion 14a and that are nearest the seat portion 12a. Within each of the pockets 38 and pockets 38a is located a packet 40 and a packet 40a, respectively, of cooling material or warming material. For example, the packets 40 and packets 40a may contain a refreezable cooling material or a reheatable warming material, such as the cooling and heating gell packs marketed under the name POLAR BEAR ICE. The packets 40 and packets 40a may also contain a one-time heating material. The pockets 38 and 38a are preferably sewn shut so that the packets 40 and packets 40a are essentially permanently enclosed therein, or the pockets 38 and 38a may be resealable—using a hook and loop, zipper, or equivalent fastening-type device or structure—so that the packets 40 and packets 40a may be individually removed from the device 10 for reheating, refreezing, or replacement.

Referring specifically to FIG. 3, a pocket or cavity area 42 is located between the head and backrest portion 14a and the pockets 38, so that the buckling apparatus 26 may be inserted therein. In this manner, the buckling apparatus 26 will be cooled or warmed by the packets 40 in the same manner as the surface of the car seat 10a during use of the temperature control device 10. The pocket 42 may be created in a number of different ways, including by securing only the short sides of the pockets 38 to the head and backrest portion 14a, as well as securing the long side of the fourth pocket 38 from the top of the head and backrest portion 14a that abuts the gap between the four pockets 38 behind head and backrest portion 14a and the two pockets 38 behind seat portion 12a—while leaving the remaining portions of the four pockets 38 behind head and backrest portion 14a unattached to the head and backrest portion 14a.

Statement of Operation

A person wishing to use the temperature control device 10 to cool the surface of the car seat 10a will first need to freeze (or at least substantially cool) the material located within the packets 40 and the packets 40a. This may be accomplished by placing the entire temperature control device 10 into a freezer or, if the packets 40 and packets 40a are removable from the pockets 38, by placing just the packets 40 and the packets 40a into the freezer. Once the packets 40 and the packets 40a are sufficiently cooled, the temperature control device 10 is ready to be used.

The next step is to place the temperature control device 10 over the car seat 10a, with the head and backrest portion 14, the seat portion 12, and the side portions 16 of the temperature control device 10 corresponding to the same portions of the car seat 10a. The temperature control device 10 is secured into position on the car seat 10a with the elastic strap 24. The buckling apparatus 26, including the relatively large padded member 32 and the buckle insert 28 is then inserted through the rectangular area 36a and into the pocket 42 between the pockets 38 and the head and backrest portion 14a.

The temperature control device 10 is left on the car seat 10a until the surface of the car seat 10a and the buckling apparatus 26 reach the desired temperature. The temperature of the surface of the car seat 10a and the buckling apparatus 26 can be checked by simply inserting a hand under the temperature control device 10a and manually checking the surface temperature of the car seat 10a and/or that of the buckling apparatus 26, or the user can simply leave the device 10 on the car seat 10a for a specified period of time. Tests have indicated that the surface temperature of the car seat 10a can be substantially reduced in as little as one minute with the use of the device 10. In one test, the temperature of a car seat surface was cooled more than 25 degrees Fahrenheit in just one minute. Thus, a user could simply leave the device 10 on the car seat 10a for one minute, after which time the car seat 10a will be sufficiently cooled to be occupied by a child.

Once the desired temperature has been achieved, the user may remove the temperature cooling device 10 with one hand by simply grasping the handle 22 and pulling the temperature cooling device 10 off of the car seat 10a. After the child has been secured in the car seat 10a, the temperature control device 10 may be stored by rolling it and then securing it in a rolled up position with the storage strap 20, as shown in FIG. 5. Storage strap 20 may either be a one-piece elastic loop that can be stretched over an end of the rolled-up temperature cooling device 10 or it may be a one or two piece strap with an attaching hook and loop assembly.

The temperature control device 10 may be reused, without first refreezing the packets 40 and packets 40a, as long as the packets 40 and packets 40a remain cold. Tests have indicated that where the material in the packets 40 and 40a has been frozen and the device 10 is kept in a rolled up position, the packets 40 and 40a maintain a substantial portion of their cooling ability over a more than eight hour period. To extend the use of the temperature control device 10, it is also possible, although generally not necessary, to store it in a cooler or other insulated container that maintains the relatively cool temperature of the packets 40 and 40a. Thus, if the temperature control device 10 is first used to cool the car seat for a trip from the house to the store, it may be rolled up and left inside the care or placed in a cooler while the child is in the car seat, and then reused on the car seat while the parent and child are in the store so that the seat will be cool for the return trip to the house. Once the packets 40 and 40a are no longer sufficiently cold to cool the surface of the car seat 10a and the buckling apparatus 26, they must be refrozen again.

If the temperature control device 10 is to be used to warm the surface of a car seat 10a and a buckling apparatus 26, the packets 40 and 40a must contain a reheatable or, if desired, a one-time use warming material. The warming material in the packets 40 and 40a will operate, when the temperature control device 10 is placed over a car seat 10a, to heat the surface of the car seat 10a and the buckling apparatus 26. When the warming material in the packets 40 and 40a is no longer sufficiently warm, it must be reheated or, if it is a one-time use material, replaced. In all other respects, the operation and storage of the temperature control device 10 will be the same, whether the device is used for warming or cooling.

While the invention has been particularly shown and described with reference to the preferred embodiments thereof, it will be understood by those skilled in the art that the foregoing and other changes in form and details may be made therein without departing from the spirit and scope of the invention.

What is claimed is:

1. A removable child car seat cooling device comprising, in combination:

covering means for covering substantially all of a top surface of a seat portion and substantially all of a top surface of a head and backrest portion of a child car seat, said covering means having a top surface and a bottom surface wherein said bottom surface contacts the top surface of the seat portion and the top surface of the head and backrest portion of the child car seat, said covering means further including:
head and backrest portions;
side portions which substantially correspond in size and dimension to side portions of the child car seat;
a flap which extends outwardly from the head and backrest portions of the covering means and along said side portions, the flap portion defining an edge portion; and
a retaining member disposed near the edge portion, the retaining member being configured and dimensioned to removably secure the temperature control device to the child car seat; and cooling means coupled to said bottom surface of said covering means for cooling the top surface of the seat portion and the top surface of the head and backrest portion of the child car seat.

2. The device of claim 1 wherein said cooling means comprises a plurality of self-contained packages of freezable material coupled to said bottom surface of said covering means.

3. The device of claim 1 wherein aperture means is located between said top surface and said bottom surface of said covering means for passage therethrough of a male portion of a safety car seat buckling apparatus for the car seat.

4. The device of claim 1 further comprising cooling means coupled to said bottom surface of said covering means for cooling a top surface of side portions of the child car seat.

5. A removable child car seat warning device comprising, in combination:

covering means for covering substantially all of a top surface of a seat portion and substantially all of a top surface of a head and backrest portion of a child car seat, said covering means having a top surface and a bottom surface wherein said bottom surface contacts the top surface of the seat portion and the top surface of the head and backrest portion of the child car seat, said covering means further including:
head and backrest portions;
side portions which substantially correspond in size and dimension to side portions of the child car seat;
a flap which extends outwardly from the head and backrest portions of the covering means and along said side portions, the flap portion defining an edge portion; and
a retaining disposed near the edge portion, the retaining member being configured and dimensioned to removably secure the temperature to the child car seat; and warming means coupled to said bottom surface of said covering means for warming the top surface of the seat portion and the top surface of the head and backrest portion of the child car seat.

6. A removable child car seat cooling device according to claim 5, wherein the covering means defines a cavity area configured and dimensioned to receive a buckle portion of a child car seat therein.

7. A removable child car seat cooling device according to claim 5, which further includes a handle disposed at an upper end portion of said top surface of said covering means, which facilitates removal of said device from the car seat with one hand.

8. A removable child car seat cooling device according to claim 5, which further includes means disposed at a bottom edge portion of the covering means, for securing said covering means in a rolled-up position.

9. A method for cooling a child car seat comprising the steps of:

providing covering means for covering substantially all of a top surface of a seat portion and substantially all of a top surface of a head and backrest portion of a child car seat, said covering means having a top surface and a bottom surface wherein said bottom surface contacts the top surface of the seat portion and the top surface of the head and backrest portion of the child car seat, said covering means further including:
head and backrest portions;
side portions which substantially correspond in size and dimension to side portions of the child car seat;
a flap which extends outwardly from the head and backrest portions of the covering means and along said side portions, the flap portion defining an edge portion; and
a retaining member disposed near the edge portion, the retaining member being configured and dimensioned to removably secure the temperature control device to the child car seat; and providing cooling means coupled to said bottom surface of said covering means for cooling the top surface of the seat portion and the top surface of the head and backrest portion of the child car seat.

10. A method for cooling a child car seat comprising the steps of:

providing covering means for covering substantially all of a top surface of a seat portion and substantially all of a top surface of a head and backrest portion of a child car seat, said covering means having a top surface and a bottom surface wherein said bottom surface contacts the top surface of the seat portion and the top surface of the head and backrest portion of the child car seat including:
head and backrest portions;
side portions which substantially correspond in size and dimension to side portions of the child car seat;
a flap which extends outwardly from the head and backrest portions of the covering means and along said side portions, the flap portion defining an edge portion; and
a retaining member disposed near the edge portion, the retaining member being configured and dimensioned to removably secure the temperature control device to the child car seat; and providing cooling means coupled to said bottom surface of said covering means for cooling the top surface of the seat portion and the top surface of the head and backrest portion of the child car seat disposing said covering means in contact with the car seat;

leaving said covering means in contact with the car seat until the car seat has been sufficiently cooled; and removing said covering means from the car seat prior to use of the car seat by a child.

11. The method of claim 10 wherein said cooling means comprises a plurality of self-contained packages of freezable material coupled to said bottom surface of said covering means.

12. The method of claim 10 further comprising the step of providing cooling means coupled to said bottom surface of said covering means for cooling a top surface of side portions of the child car seat.

13. The method of claim 10 further comprising the step of freezing said cooling means.

14. A removable child car seat cooling device according to claim 1, wherein the covering means defines a cavity area configured and dimensioned to receive a buckle portion of a child car seat therein.

15. A removable child car seat cooling device according to claim 1, which further includes a handle disposed at an upper end portion of said top surface of said covering means, which facilitates removal of said device from the car seat with one hand.

16. A removable child car seat cooling device according to claim 1, which further includes means disposed at a bottom edge portion of the covering means, for securing said covering means in a rolled-up position.

* * * * *